(12) United States Patent
Dickinson

(10) Patent No.: US 9,330,448 B2
(45) Date of Patent: May 3, 2016

(54) ADAPTIVE FEATURE RECOGNITION TOOL

(75) Inventor: Brian Ray Dickinson, Grass Lake, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1260 days.

(21) Appl. No.: 13/238,716

(22) Filed: Sep. 21, 2011

(65) Prior Publication Data
US 2013/0070963 A1 Mar. 21, 2013

(51) Int. Cl.
*G06K 9/00* (2006.01)
*G06T 7/00* (2006.01)

(52) U.S. Cl.
CPC ..... *G06T 7/0004* (2013.01); *G06T 2207/30164* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 5,073,005 A * | 12/1991 | Hubbs | 359/515 |
| 5,455,765 A | 10/1995 | Pryor | |
| 5,856,844 A * | 1/1999 | Batterman et al. | 348/207.99 |
| 5,973,788 A | 10/1999 | Pettersen et al. | |
| 6,796,043 B2 | 9/2004 | Jackson et al. | |
| 7,180,607 B2 | 2/2007 | Kyle et al. | |
| 7,307,737 B1 | 12/2007 | Kling, III et al. | |
| 7,500,318 B2 | 3/2009 | Dickinson | |
| 7,637,023 B2 | 12/2009 | Dickinson | |
| 7,869,026 B2 | 1/2011 | Boyer et al. | |
| 2011/0284415 A1 * | 11/2011 | Balakier et al. | 206/459.1 |

* cited by examiner

*Primary Examiner* — Sumati Lefkowitz
*Assistant Examiner* — Carol Wang
(74) *Attorney, Agent, or Firm* — Dinsmore & Shohl LLP

(57) ABSTRACT

The present invention provides an adaptive feature recognition tool that can be used to determine the location and/or count discrete features on an object being manufactured in a relatively quick time fashion. The tool can include an elongated rigid member that has a first end with a generally planar surface, the generally planar surface having a plurality of contrast targets thereon. The elongated rigid member can also have a second end for placement at a desired location, for example placement on a plurality of features whose number and/or location(s) on the object is desired. In addition, an exposure device that is operable to expose specific subsets of the plurality of contrast targets to a line-of-sight digital imaging device can be included.

6 Claims, 2 Drawing Sheets

ADAPTIVE FEATURE RECOGNITION TOOL

FIELD OF THE INVENTION

The present invention is related to a feature recognition tool, and in particular to a single feature recognition tool that can be used to determine the position of and/or count a number of different discrete features on an object.

BACKGROUND OF THE INVENTION

An important activity in industrial manufacturing processes is determining the location and/or quantity of various features on an object being manufactured. For example, the location and/or number of specific size or type of holes, studs, welds, and the like on a vehicle frame can be used for quality assurance purposes, modeling, etc.

Heretofore activities for determining the location and/or number of various features include advanced computer-aided photogrammetry in which feature specific attachment position adapters are attached to individual features and/or physically counting of such features. However, the use of heretofor position adapters in combination with advanced computer-aided photogrammetry can take a relatively large amount of time and physically counting of a feature can result in human error. Therefore, an adaptive feature recognition tool that aids in relatively quick determination of the generally precise location of one or more specific features and can also be used for counting the number of specific features associated with an object being manufactured would be desirable.

SUMMARY OF THE INVENTION

The present invention provides an adaptive feature recognition tool that can be used to determine the location and/or number of different specific features on an object being manufactured in a relatively quick time fashion. The tool can include an elongated rigid member that has a first end with a generally planar surface, the generally planar surface having a plurality of contrast targets thereon. The elongated rigid member can also have a second end for placement at a desired location, for example placement on a feature whose location on the object is desired. In addition, the second end can be placed on a plurality of features whose number on the object is desired. In addition, an exposure device, e.g. an aperture device, that is operable to expose a first subset and then subsequent subsets, e.g. a second subset, of the plurality of contrast targets to a line-of-sight digital imaging device can be included.

The exposure device can be an opaque cover with an opening and/or aperture, the cover being rotatably or otherwise attached to the first end of the elongated rigid member and the cover with the opening dimensioned to cover the plurality of contrast targets except for the first subset of contrast targets when the cover is located at a first position on the first end and to cover the plurality of contrast targets except for a subsequent subset of targets when the cover is located at a subsequent position on the first end. In some instances, the first end can have a plurality of detents, slots, etc., such that the cover can engage at least one of the detents, slots, etc., when in each position.

The second end of the elongated rigid member can be a pointed end that is operable to be placed onto a feature at a generally precise location. In addition, the elongated rigid member can be dimensioned to be a hand-held member such that an individual can grasp the adaptive feature recognition tool and easily place it onto a feature of the object.

The plurality of contrast targets can be a plurality of illumination devices, for example a plurality of light emitting diodes, and in such instances, the exposure device can be an electronic circuit that has a first switch and a second switch etc., the electronic circuit being operable to illuminate the first subset of contrast targets when the first switch is activated and illuminate a subsequent subset of contrast targets when a subsequent switch is activated.

The invention also includes a process for counting a plurality of first specific features and a plurality of subsequent specific features on an object. The process includes providing the adaptive feature recognition tool described above with the exposure device operable to expose the first subset of contrast targets and one or more subsequent subsets of contrast targets. It is appreciated that the first subset and the one or more subsequent subsets of contrast targets can provide a first contrast target pattern and one or more subsequent contrast target patterns, respectively.

The process can also include providing a digital imaging device known to those skilled in the art that is operable to recognize specific patterns of contrast targets. Thereafter, the second end of the tool is placed onto each of the plurality of first features while the first subset of contrast targets is exposed by the exposure device to the digital imaging device. In addition, the digital imaging device captures an image of an exposed contrast target pattern each time the second end is placed onto one of the specific features. The second end is also be placed onto each of the plurality of one or more subsequent features while one or more subsequent subsets of contrast targets are exposed by the exposure device to the digital imaging device, the digital imaging device capturing an image of subsequent contrast target patterns each time the second end is placed onto one of the subsequent features. Finally, the process can include counting and tabulating the number of discrete features captured by the corresponding contrast target patterns.

In some instances, an electronic switch that is in electronic communication with the digital imaging device can be provided with activation of the electronic switch each time the second end is placed onto each of the plurality of first features and the plurality of second features affording for an image capture of a contrast target pattern. The electronic switch can be a wireless electronic switch in wireless communication with the digital imaging device which thus allows an individual to: hold the tool; sequentially place the second end of the tool onto each of the plurality of discrete features; and activate the wireless switch such that images of the discrete contrast target patterns are captured when the second end is placed onto each of the first features and images of the second contrast target pattern are captured when the second end is placed onto each of the second features. It is appreciated that the digital imaging device can have a microprocessor or software algorithm that keeps count of the number of captured contrast target. In this manner, the adaptive feature recognition tool affords for relatively easy and generally quick counting of the number of discrete features in relation to their corresponding contrast target patterns that are present on or within an object.

DETAILED DESCRIPTION OF THE PRESENT INVENTION

Figures 1, 2:
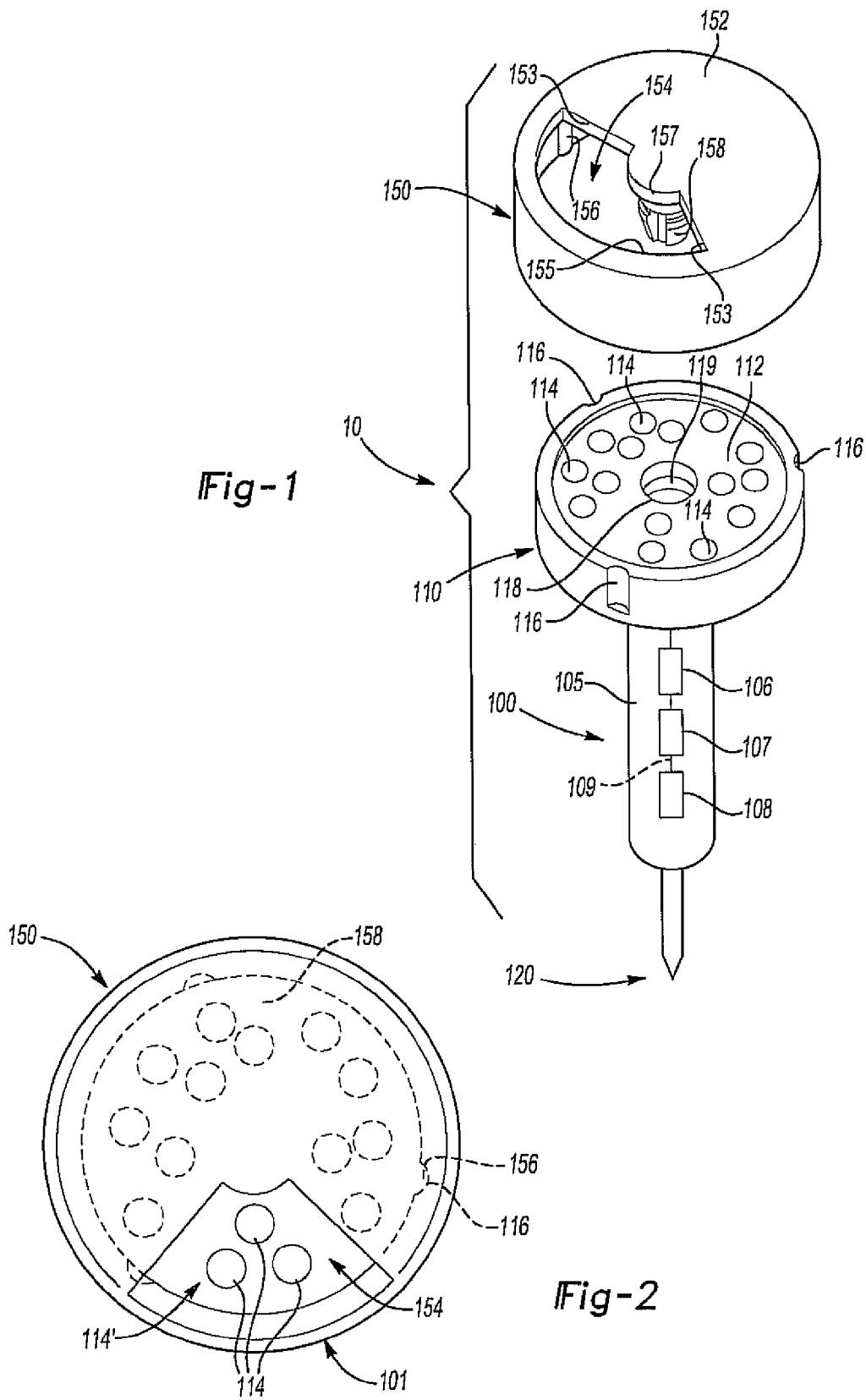
FIG. 1 is a perspective viewing of an adaptive feature recognition tool according to an embodiment of the present invention.
FIG. 2 is a top view of the tool shown in FIG. 1 with an opaque cover located at a first position.

The present invention provides an adaptive feature recognition tool that can be used to help count and/or locate a plurality of discrete features on an object. Therefore, the present invention has utility as a quality assurance tool.

The adaptive feature recognition tool can be in the form of an elongated rigid member that has a first end with a generally planar surface. In addition, the generally planar surface can have a plurality of contrast targets located thereon. The elongated rigid member can also have a second end that can be placed at a desired location on an object.

An exposure device, e.g. an adjustable aperture, device that is operable to expose a discrete subset and then one or more subsequent subsets of the plurality of contrast targets to a line-of-sight digital imaging device is also included. In some instances, the exposure device is an opaque cover with an opening that can be attached, e.g. rotatably attached, to the first end of the tool. By placing the opaque cover at a discrete position relative to the generally planar surface of the first end, the opening can expose a corresponding subset of the plurality of contrast targets, and by placing the opaque cover at one or more subsequent positions, e.g. a second position, third position, etc., the opening can expose one or more subsequent subsets of the plurality of contrast targets. In addition, the one or more subsequent subsets of the contrast targets can each provide a unique contrast target pattern that can be recognized by the digital imaging device with each of the unique contrast target patterns being associated or identified with a distinct feature or type of feature on an object.

In the alternative, or in addition to, the opaque cover with an opening, the exposure device can be an electronic circuit with a first switch and one or more subsequent switches that are in electronic communication with the plurality of contrast targets in the form of a plurality of illumination devices. As such, activation of the first switch can illuminate the first subset of the illumination devices such that the first contrast target pattern is exposed to the digital imaging device. Likewise, activation of one or more of the subsequent switches can illuminate one or more subsequent subsets of contrast targets such that the one or more subsequent subsets of contrast targets are exposed to the digital imaging device.

The present invention also includes a process of using the adaptive feature recognition tool to determine the location and/or number of a plurality of discrete features on an object. The process includes holding the tool, e.g. an individual holding the tool, placing the second end at a desired location relative to the object and capturing digital images of corresponding contrast target patterns that are exposed through the use of the cover and/or the electronic circuit. Furthermore, by selecting which contrast target pattern is exposed, the individual can easily and quickly place the second end of the tool onto a plurality of corresponding features and take a digital image of the target pattern each time the second end is placed onto each of the corresponding features. Then when the location and/or number of a subsequent feature is desired, a corresponding contrast target pattern can be exposed with digital images taken each time the second end of the tool is placed onto each of the corresponding features. It is appreciated that the digital imaging device can have a microprocessor and/or software that stores and/or keeps count of the number of the images taken for each discrete contrast target pattern. In this manner, the process provides for counting a plurality of discrete features.

Turning now to FIG. 1, an embodiment of an adaptive feature recognition tool is shown generally at reference numeral 10. The tool 10 can include an elongated rigid member 100 having a first end 110 and a second end 120. The first end 110 can have a generally planar surface 112 with a plurality of contrast targets 114 located thereon and the second end 120 can be a pointed end that affords for placement at a generally precise location on an object.

The tool 10 can also include an exposure device, for example an opaque cover 150 that has an opaque surface 152 and an opening 154. The opening 154 affords for exposure of at least a portion of the plurality of contrast targets 114 therethrough.

In some instances, the first end 110 can be generally circular in shape and the opaque cover 150 can have a complementary cylindrical or circular shape such that it fits over the first end 110. In such instances, the opening 154 can have a pair of side edges 153 that extend radially from a central axis of the tool 10, along with an outer circumferential edge 155 and an inner circumferential edge 157. It is appreciated that the distance between the pair of side edges 153 and the circumferential edges 155, 157 is such that a desired area of the generally planar surface 112 is uncovered at any time when the cover 150 is attached to the first end 110.

The first end 110 can also have a plurality of slots or indentations 116, while the cover 150 can have one or more detents 156 that can engage the indentations 116 such that the cover 150 can be snapped into a first position, a second position, and the like. In addition, the cover 150 can have a central shaft 158 that can fit at least partially within a central aperture 118 of the first end 110. In some instances, the central shaft 158 can have a catch mechanism that engages a ledge 119 of the aperture 118. In this manner, the cover 150 can be securely attached to the first end 110 and yet be rotatable to different positions.

In addition to, or in the alternative to, the cover 150, an electronic circuit 109 with a first switch 106, a second switch 107, and/or a third switch 108 can serve as the exposure device. In such an instance, the plurality of contrast targets 114 can be in the form of a plurality of illuminating devices such as a plurality of light emitting diodes (LEDs). In addition, activation of the first switch 106 can illuminate a first subset of the plurality of contrast targets 114, activation of the second switch 107 can illuminate a second subset of the plurality of contrast targets 114, and the like.

Figure 3:
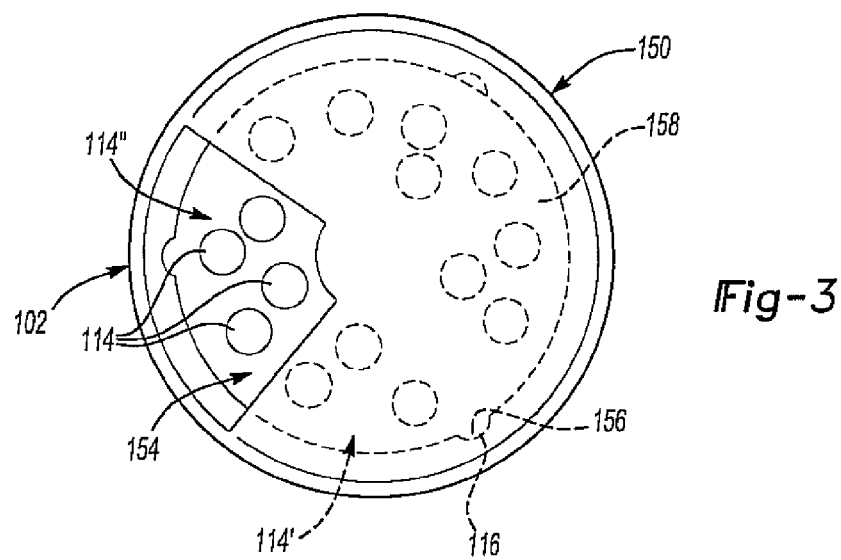
FIG. 3 is a top view of the tool shown in FIG. 1 with an opaque cover located at a second position.

Turning now to FIGS. 2 and 3, illustrations of the exposure device in the form of the opaque cover 150 being located at a first position 101 and a second position 102, respectively, are shown. As shown in FIG. 2, with the cover 150 in the first position 101, a first subset 114' of the plurality of contrast targets 114 can be exposed. It is appreciated that such a subset of contrast targets 114' can provide a first contrast target pattern that can be viewed by a line-of-sight digital imaging device. Likewise, FIG. 3 illustrates that with the cover 150 located at the second position 102, a second subset of contrast targets 114" can be exposed while the remaining plurality of contrast targets is covered or shielded from a line-of-sight digital imaging device. As such, a user can select which set of contrast targets is to be exposed to a line-of-sight digital imaging device.

Figure 4:
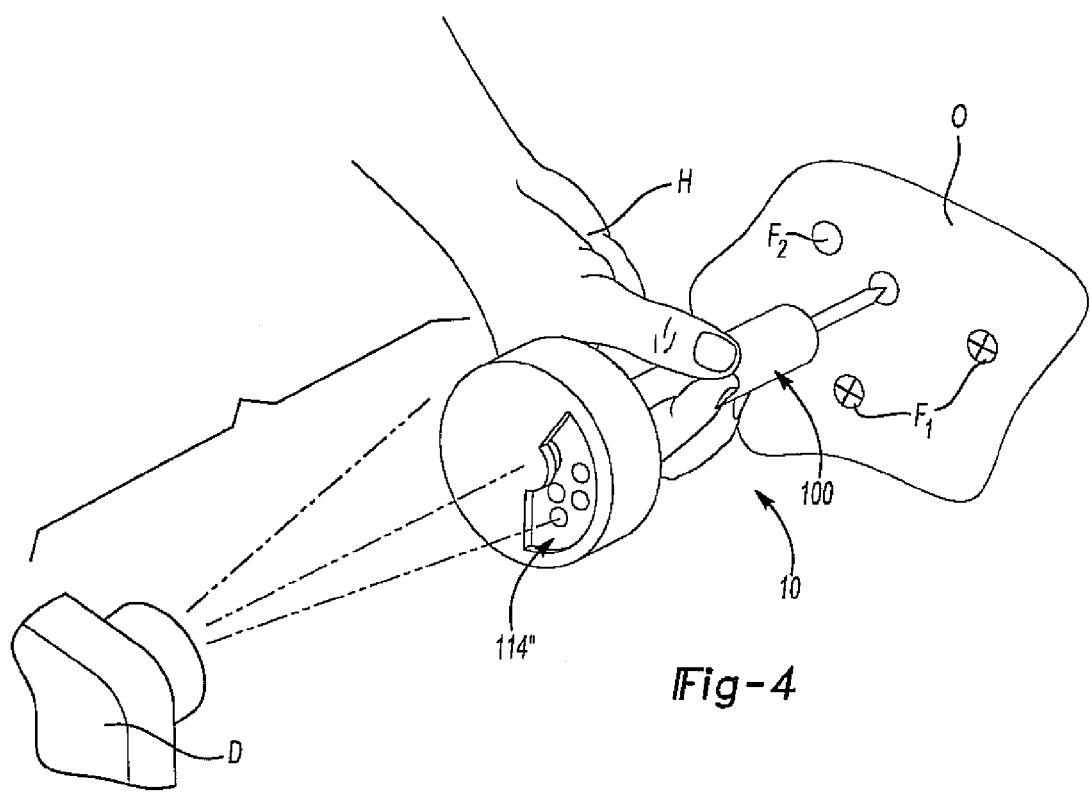
FIG. 4 is a schematic illustration of the tool shown in FIG. 1 being used by an individual.

Turning now to FIG. 4, a schematic illustration of the use of the tool 10 is shown with an individual's hand H grasping the tool 10 and placing the second end 120 on a feature $F_2$.

The feature $F_2$ can be part of an object O and with the cover 150 located in the second position 102 as illustrated in FIG. 3, the second contrast target pattern 114" is exposed to a line-of-sight digital imaging device D. Also shown in the figure are features $F_1$. As such, it is appreciated that the individual can place the second end 120 on each of the features $F_1$ while the digital imaging device D is used to capture, for example, the first contrast target pattern 114'. Thereafter, the user can change the position of the cover 150 such that the second contrast target pattern 114" is exposed and thus while the second end 120 is placed onto each of the features $F_2$, the digital imaging device D affords for capturing of an image of the pattern 114".

As stated above, the digital imaging device D can be in electronic communication with an electronic switch known to those skilled in the art that affords for taking of the image and a microprocessor that affords for keeping count and determining the location of each of the various features. In this manner, a plurality of first features $F_1$ and a plurality of second features $F_2$ can be easily and generally quickly determined. It is also appreciated that advanced computer-aided photogrammetry as known to those skilled in the art affords for the location of the features through capturing of the first contrast target pattern 114', the second contrast target pattern 114", and the like when the second end 120 of the tool 10 is placed on or into contact with each of the features. Stated differently, given the known dimensions of the tool 10, it is appreciated that advanced computer-aided photogrammetry affords for location of a given feature on an object once a given contrast target pattern is recognized and an image taken thereof.

The tool 10 can be made from any material known to those skilled in the art having desired properties such as strength, weight, stiffness, and the like. For example and for illustrative purposes only, the elongated rigid member 100 and/or the cover 150 can be made from ceramics, plastics, metals, alloys, wood, etc. In addition, the contrast targets 114 can be paper contrast targets that are attached to the generally planar surface 112, contrast targets that are painted onto the surface 112, etc. In the alternative, and as stated above, the contrast targets 114 can be illuminating devices such as LEDs and the like.

In view of the teaching presented herein, it is to be understood that numerous modifications and variations of the present invention will be readily apparent to those of skill in the art. As such, the foregoing is illustrative of specific embodiments of the invention, but is not meant to be a limitation upon the practice thereof. It is the following claims, including all equivalents, which define the scope of the invention.

I claim:

1. An adaptive feature recognition tool comprising:
   an elongated rigid member having a central axis and a first end with a circular shape and a planar surface, said first end having a central aperture through said planar surface and a plurality of contrast targets on said planar surface;
   said elongated rigid member also having a second end with a point end for placement at a desired location; and
   an opaque cover with a circular shape and a central shaft, said opaque cover fitting over said first end with said central shaft at least partially within said central aperture of said planar surface, said opaque cover having an opening with a pair of side edges extending radially from said central axis, said opaque cover operable to rotate to different positions on said first end with said opening exposing a first subset and then a second subset of said plurality of contrast targets on said planar surface of said first end to a line-of-sight digital imaging device.

2. The adaptive feature recognition tool of claim 1, wherein said first end has a plurality of detents, said opaque cover engaging at least one of said detents when in each selected position.

3. The adaptive feature recognition tool of claim 1, wherein said elongated rigid member is dimensioned to be a hand-held member.

4. An adaptive feature recognition tool comprising:
   an elongated rigid member having a central axis and a first end with a circular shape and a planar surface, said first end having a central aperture through said planar surface and a plurality of contrast targets on said planar surface;
   said elongated rigid member also having a second end with a point end for placement at a desired location; and
   an opaque cover with a circular shape and a central shaft, said opaque cover fitting over said first end with said central shaft at least partially within said central aperture of said planar surface, said opaque cover having an opening with a pair of side edges extending radially from said central axis, said opaque cover rotatably attached to said first end and having a plurality of positions, said opening dimensioned to cover said plurality of contrast targets except for a specific subset of contrast targets when said cover is at a specific position of said plurality of positions on said first end.

5. The adaptive feature recognition tool of claim 4, wherein said first end has a plurality of detents, said opaque cover engaging at least one of said detents when in each specific position of said plurality of positions.

6. The adaptive feature recognition tool of claim 4, wherein said elongated rigid member is dimensioned to be a hand-held member.

* * * * *